United States Patent

Malot

[11] 3,945,750
[45] Mar. 23, 1976

[54] BORING MACHINE FOR WORK PIECES OF LARGE DIAMETER

[75] Inventor: André Malot, LeCreusot, France
[73] Assignee: Creusot-Loire, Paris, France
[22] Filed: Mar. 5, 1974
[21] Appl. No.: 448,396

[30] Foreign Application Priority Data
Mar. 14, 1973 France .............................. 73.09040

[52] U.S. Cl. ................ 408/117; 408/129; 408/234; 90/15 A; 90/DIG. 8
[51] Int. Cl.² ..................... B23B 41/00; B23B 47/18
[58] Field of Search... 90/15 R, 12 R, 15 A, DIG. 8, 90/11 R; 408/10, 44, 77, 111, 117, 129, 234

[56] References Cited
UNITED STATES PATENTS
3,613,502  10/1971  Wagner ............................ 90/15 R
3,680,440  8/1972  Goldshtein et al. ................ 90/15 R

*Primary Examiner*—Gil Weidenfeld
*Attorney, Agent, or Firm*—Cameron, Kerkam, Sutton, Stowell & Stowell

[57] ABSTRACT

A boring machine for large diameter workpieces such as reactor vessels, the machine comprising a horizontally work table, preferably in a pit, a gantry spanning the work table, a boring bar centered at its lower end on the table and at its upper end on the gantry, a drive to rotate the bar and a tool carrier mounted for movement along the bar.

9 Claims, 9 Drawing Figures

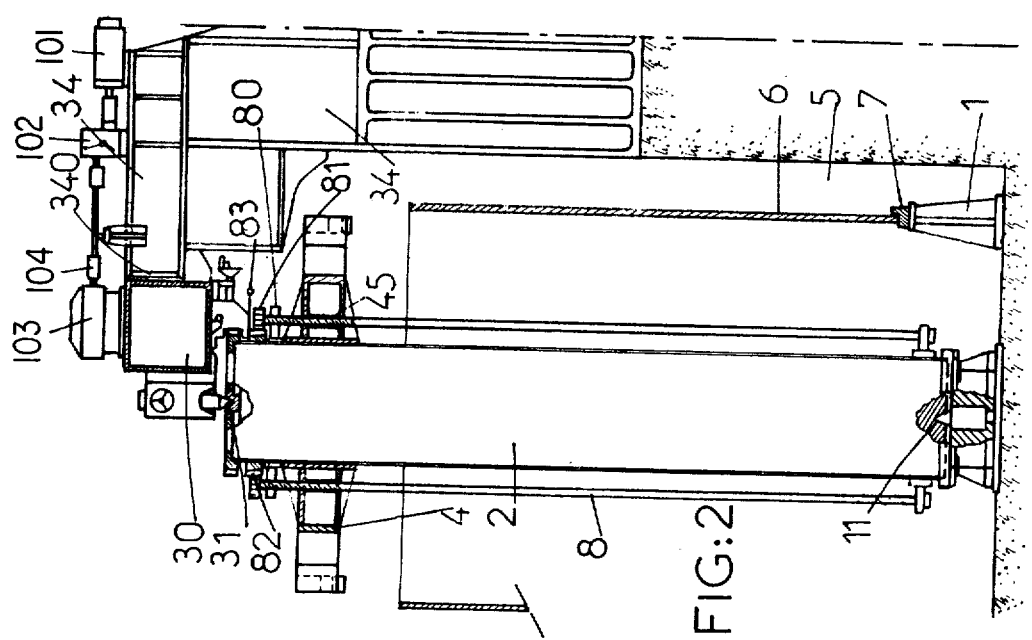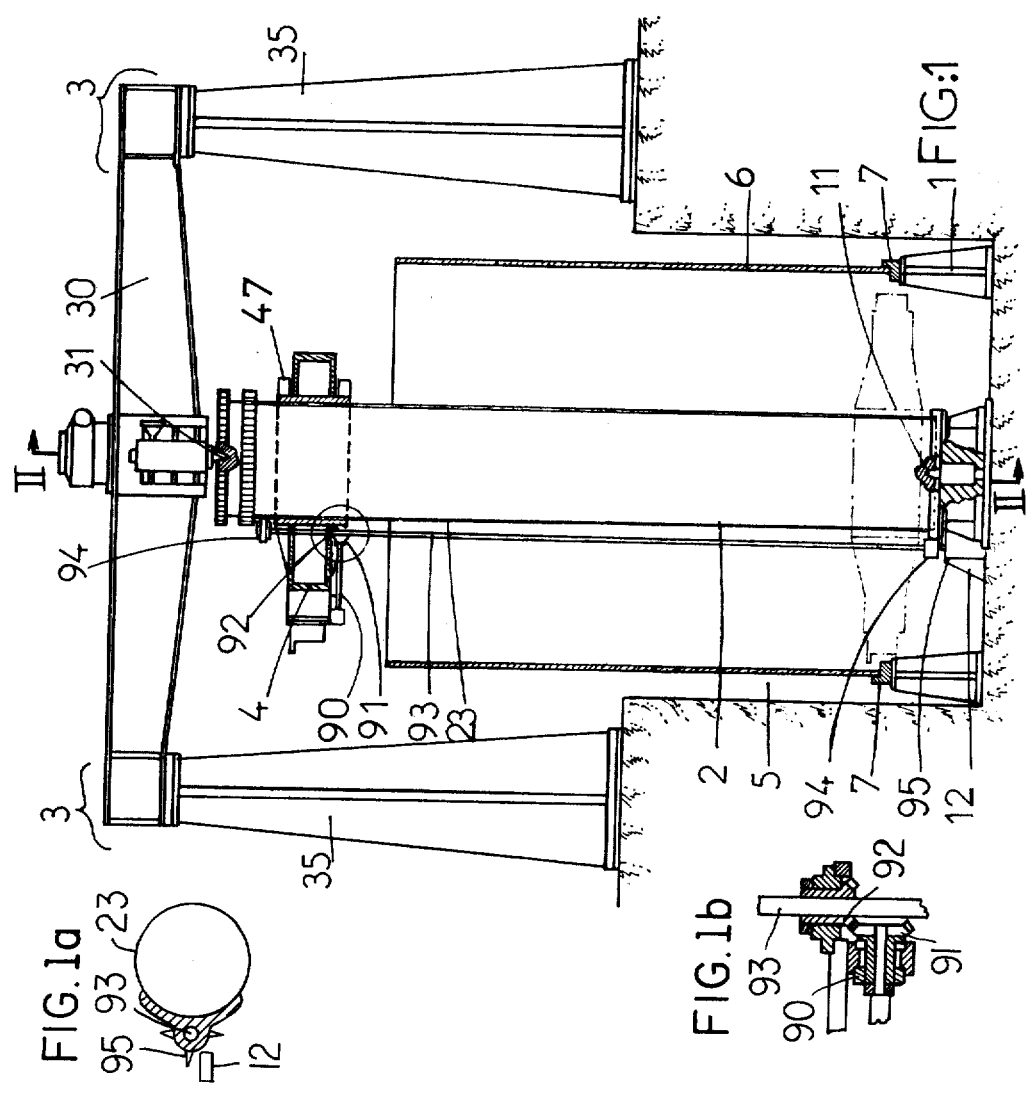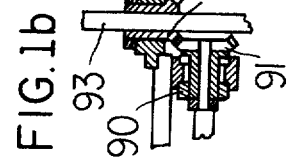

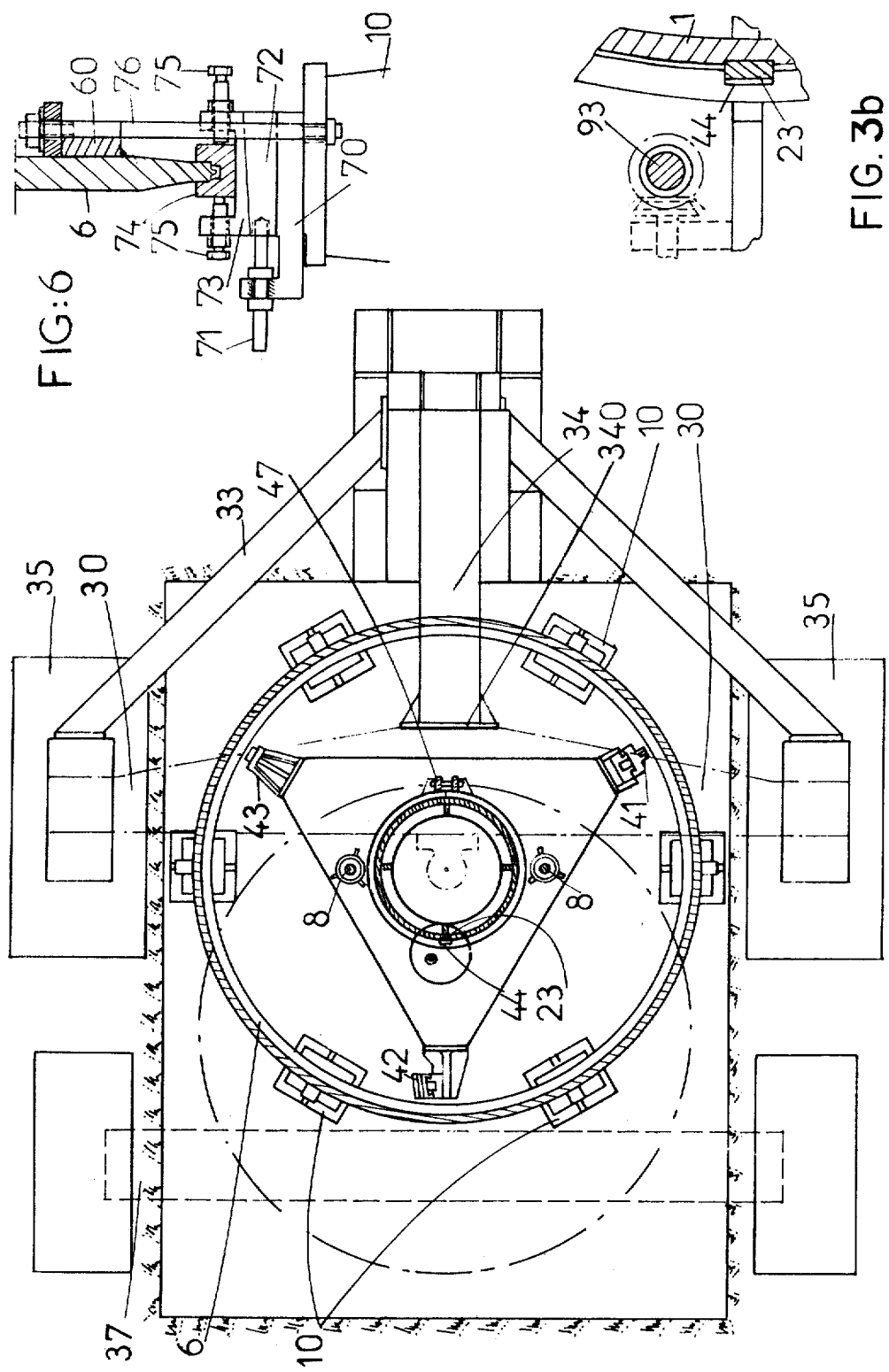

U.S. Patent   March 23, 1976   Sheet 3 of 3   3,945,750
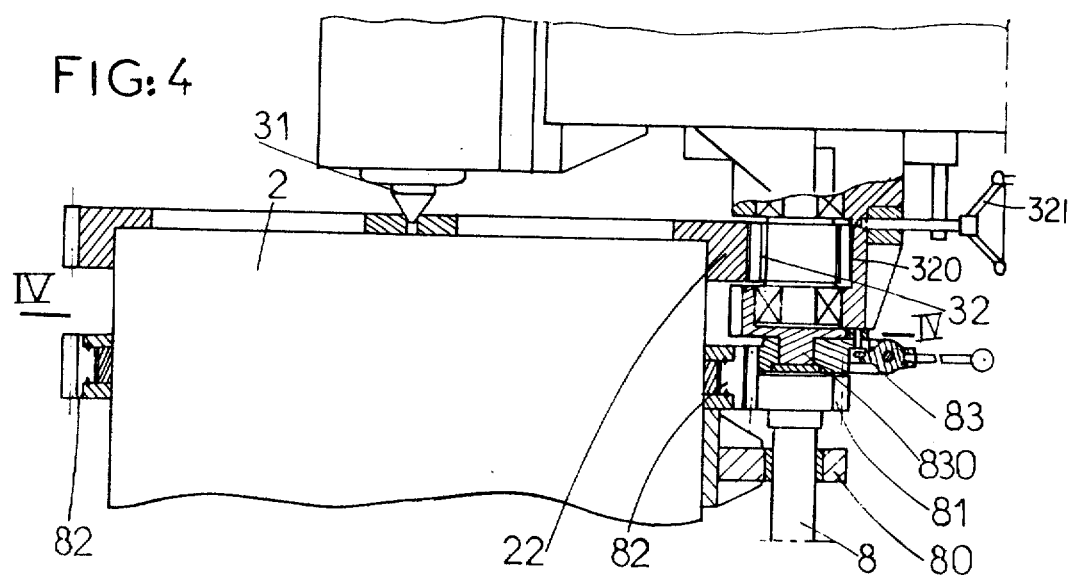
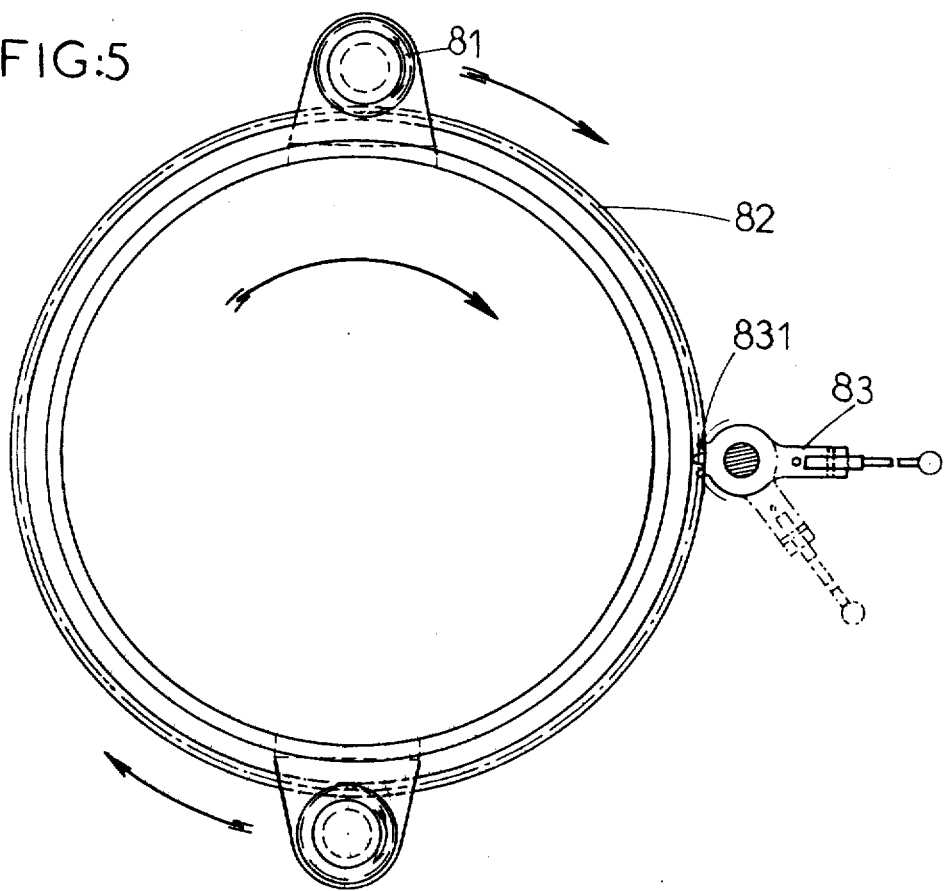

BORING MACHINE FOR WORK PIECES OF LARGE DIAMETER

This invention is concerned with boring machines for machining workpieces of large dimensions.

In order to bore and provide connecting profiles in the interiors of workpieces of large dimensions such as vessels for nuclear reactors, vertical lathes are generally used. However, these vessels are being made progressively larger, thus preventing the use of traditional machines. Further, the vessels are of a thickness which is small compared with their diameter and height, and therefore are easily deformed. It is therefore difficult to machine them with a high degree of precision.

The object of the invention is a machine specially designed for this work.

In accordance with the invention, there is provided a boring machine comprising a work table, a boring bar, a tool carrier which can slide along the bar and is solid in rotation with this latter, a means of rotary drive of the bar about its axis and a means of positioning of the tool carrier along the bar, the work table being horizontal and the boring bar being maintained in a vertical position by means of two centering devices, one placed on the work table, and the other on a horizontal cross-piece of a gantry passing over and at a certain distance from the table.

Preferably at least one of the centering devices of the boring bar, together with the said bar, is dismountable, and the work table is placed at the bottom of a pit straddled by the gantry.

The invention will now be described in more detail, by reference to a particular embodiment, given by way of an example and shown on the attached drawings.

FIG. 1 is a general view from the front of an embodiment of machine in accordance with the invention.

FIG. 1a is an enlarged detail view of the star wheel and stop of FIG. 1.

FIG. 1b is an enlarged detail view of the tool carrier advancing mechanism of FIG. 1.

FIG. 2 is a cross-sectional view through II—II in FIG. 1.

FIG. 3a is a view from above, with the gantry removed.

FIG. 3b is an enlarged detail in partial section of the interconnection between the carrier and the boring bar of the machine.

FIG. 4 is a detailed view of the drive systems for the boring bar and for positioning the work table.

FIG. 5 is a view from above of the positioning system.

FIG. 6 is a detailed view of the system for clamping the workpiece.

The machine, shown in its entirety in FIGS. 1, 2 and 3, comprises a work table 1, a boring bar 2 and a gantry 3 provided with a horizontal cross-piece passing above the work table.

The boring bar 2 is maintained vertical by two centering devices 11 and 31 which are placed respectively one on the work table, and the other on the horizontal cross-piece 30 and which are poppet centre carriers with a large axial loading. A tool carrier 4 slides along the boring bar. In the example shown, the work table is placed at the bottom of a pit 5 straddled by the horizontal cross-piece of the gantry 3.

The part 6 to be machined is fixed on the work table by means of clamping devices 7.

The boring bar is rotated by an electric motor, a gear box and a reducing gear mounted on the gantry 3. To the end of the output shaft of the reducing gear there is keyed a pinion with V-shaped teeth 32 (FIG. 4) engaging with a driving crown-wheel 22 fixed to the upper part of the bar 2. The V-shaped teeth enable the drive to be smooth.

The tool carrier 4 is made from a metallic support in the shape of an equilateral triangle. At the three apices of the triangle are mounted the tool carriages. It is possible, for example, to make use of a tool carriage for conical boring 41, cylindrical boring 42 and surfacing 43 (FIG. 3a).

The carrier 4 has a central cylindrical orifice and is traversed by the boring bar. In addition, this latter is provided with a rectilinear boss 23 parallel to its axis, which engages without any play in a groove 44 lying along the cylindrical orifice of the carrier. In this manner, the carrier can slide along the boring bar whilst still being caused to rotate by this latter (FIG. 3b).

A belt 46 and a means of tightening 47 (FIG. 3a) enable the carrier to be fixed in position on the boring bar.

The position of the carrier 4 along the boring bar is determined by two screws 8 parallel to the axis of the boring bar, and maintained at a certain distance from this latter by bearings 80 fixed on the boring bar (FIGS. 4 and 5). Each screw 8 engages in an internally threaded cylindrical bore 45, in a part solid with carrier 4. In this manner, simultaneous rotation of the screws about their axes leads to displacement of the carrier along the boring bar.

Rotation of each screw is controlled by a pinion 81 mounted at the end of each screw, and which engages with a toothed crown-wheel 82 mounted loosely on the boring bar, below the driving wheel 22. In normal operation, the screws 8, solid with the boring bar, are driven round with this latter and also drive the crown-wheel 82. However, the loose wheel 82 can be prevented from rotating by means of a stop 83 which is composed of a lever mounted so as to pivot about an axle 830 solid with the cross-piece 30, and provided at its ends with teeth 831 which can be engaged with the teeth of the loose crown-wheel 82 by rotation of the lever 83 about its axis. In these conditions the loose crown-wheel 82 is prevented from rotating and then behaves as the solar of a differential around which the pinions 81 move as satellites, thus controlling the rotation of the screws 8 about their axis, and from this the displacement of the carrier 4 along the boring bar.

In consequence, by preventing rotation of the loose crown-wheel 82, it is possible, by rotation of the boring bar in one direction or the other, to control the ascent or descent of the carrier along the said bar, in such a manner as to position the tools in front of the zones to be bored.

The tool carriages include of course a system for advancement of the tool which, in the case shown, is controlled by the rotation of the boring bar.

For this purpose, each tool carriage includes an advancing mechanism 9 (FIG. 1) driven by a shaft 90 with a conical pinion 91 at its end, engaging with a pinion 92 mounted loosely on the carrier 4, sliding along a movement bar 93, while being caused to rotate by this latter.

The bar 93 is maintained parallel to the axis of the boring bar, and at a certain distance from this by bearings 94 fixed to the boring bar, and carries a star 95 (FIG. 1a) at its end; the branches of this star can meet, in the course of rotation of the boring bar, one or more stops 12 arranged on the work table, each impact causing the movement bar 93 to rotate through a certain angle, thus causing the desired advance of the tool.

As has been shown, the work table is mounted with advantage in the bottom of a pit 5. It comprises a number of brackets 1 distributed round the axis of the boring bar, and each carrying a device 7 for clamping the workpiece, shown in detail in FIG. 6. Each clamping device 7 consists of a support 70 fixed to the bracket 1, on which there is supported a screw 71 for displacement of a wedge 72 with its upper face inclined and which can slide along the lower corresponding face of a support piece 73 which can be vertically displaced with respect to the support 70.

The piece 6 to be bored rests on the support piece 73 with an interposed block 74. Two screws 75 supported by piece 73 and by block 74 permit piece 6 to be positioned radially. The level is adjusted by screw 71, by means of wedge 72.

Finally, fixing bolts 76 attached to each bracket 1 and supported by a boss 60 solid with the piece 6 enable this latter to be firmly fixed in its working position.

If reference is made to FIGS. 1 and 2, it is seen that the gantry 3 comprises two lateral columns 35, supporting the horizontal cross-piece 30, and a central pillar 34, the rear part of which is connected to the columns 35 by strainers 33, and the upper part of which is provided with a bracket passing over the pit 5, on which bracket is fixed the centre of the horizontal cross-piece 30.

The drive motor 101 and the gear box 102 are placed on the upper part of the central pillar 34, the reducer 103 being solid with the horizontal cross-piece 30 and connected to the gear box by a dismountable coupling 104. We thus obtain a perfectly rigid assembly, but one such that the horizontal cross-piece may be easily dismounted since it is fixed only on two columns and the central pillar.

Dismounting of the horizontal cross-piece 30 and use of a pit 5 considerably facilitate the positioning of workpieces, even when of large dimensions.

In fact, when the cross-piece is removed, it is possible to use a travelling crane to bring the workpiece 6 between the lateral columns 35, and lower it to the bottom of the pit.

The pit 5 can with advantage take the form of an elongated rectangle with its longer side opposite to the central pillar 34, as shown on FIG. 3. This arrangement will in fact enable the piece 6 to be placed in a position off the boring axis, shown by the broken line on FIG. 3, which facilitates the positioning of the boring bar inside the workpiece.

Further, the driving pinion 32 of the driving wheel is mounted on a mobile carrier 320 which is drawn back before each assembly or dismounting, in order to avoid all contact with the teeth during the process of positioning of the boring bar.

The horizontal cross-piece 30 is then brought up and fixed on column 35 and on a supporting plate 340 of the central column 34. The boring bar is then brought up by a travelling crane which lowers it down inside the workpiece 6 and places it between the lower fixed point 11 and the upper point 31; this latter can be displaced axially and is moved away for positioning of the bar and is then brought forward and fixed in the working position.

Pinion 32 is then brought close to crown-wheel 22 and engages with it.

At this moment piece 6 can be lifted again and placed on the clamping devices 7. As has been seen, the screws 71 and 75 enable piece 6 to be perfectly levelled and centred. After fixing the lower part of piece 6 in position by means of the bolts 76, a set of shims are placed in position, supported by the outer wall, of piece 6 and the lateral walls of the pit 5. Due to the arrangement of the workpiece in the pit, we thus have the advantage of a perfect support enabling the vibrations, which could be substantial having regard to the rigidity of the workpiece, to be absorbed.

For support of the part of the piece projecting from the pit, it is of advantage to provide support cradles on the central pillar 34 and on an auxiliary cross-piece 37 (FIG. 3a) straddling the pit 5 from the other side of the workpiece.

Due to the special features which have just been described, and in particular to the ease of dismounting and remounting of the boring bar, and to the arrangement of the work table horizontally in the bottom of a pit, the boring machine described enables machining of great precision to be carried out on pieces of large dimensions. This is secured in particular due to the excellent support of the piece along the whole of its outer surface, and of the perfect dynamic equilibrium of the support which is symmetrical with respect to the boring axis. The triangular shape of the support also enables three tools to be used, either simultaneously or one after the other.

The invention is of course not limited to the details of the method of realisation which has just been described, but on the contrary it includes all variants. Thus in particular the different means used for driving the boring bar or positioning the support and tools may clearly be replaced by equivalent means fulfilling the same function.

What is claimed is:

1. Boring machine comprising a work table, a boring bar, a tool carrier sliding along the bar for rotation with said bar, means for rotating said bar about its axis and means for positioning said tool carrier along said bar, said work table being horizontal and said boring bar being maintained in a vertical position by two centering devices, one of said device being located on said work table, and the other of said devices being mounted on a horizontal cross-piece of a gantry extending over and spaced from said table.

2. Boring machine in accordance with claim 1, wherein said means for rotating said bar includes a reducing gear unit mounted on said gantry and connected to said bar by a pinion engaging a toothed crown-wheel secured to the upper part of said bar.

3. Boring machine in accordance with claim 1, wherein said work table is at the bottom of a pit, said gantry extending over said pit.

4. Boring machine in accordance with claim 3, including a plurality of adjustable supports for said table disposed on a circle and resting on the bottom of the pit.

5. Boring machine in accordance with claim 1, said centering devices for said boring bar being two points, one of said points being on the bottom of a pit and the other of said points being horizontal cross-piece, and engaging holes in the ends of said bar.

6. Boring machine in accordance with claim 1, wherein said tool carrier is a regular polygon centred on the axis of said boring bar and a tool carriage at each apex of the polygon.

7. Boring machine in accordance with claim 6, wherein said carrier is an equilateral triangle, and tools on said tool carriages.

8. Boring machine in accordance with claim 1, wherein said means for positioning said tool carrier includes a toothed crown-wheel freely mounted at one end of said boring bar, means for clamping and for releasing said crown-wheel for rotation about said bar, at least one pinion engaging said crown-wheel and keyed to an end of a screw disposed parallel to said boring bar, bearings for said screw on said bar, said screw engaging a threaded bore of a part secured to said carrier.

9. Boring machine in accordance with claim 1, wherein said tool carrier includes at least one tool carriage, means for advancing a tool on said tool carriage and means for control of said advancing means comprising a movement bar rotating in bearings parallel to and secured to said boring bar a multi-branch star, on the lower end of said movement bar, a fixed stop engaging and rotating said star and a control pinion for said advancing mechanism mounted on said tool carrier and sliding along said movement bar and rotated by said bar with each rotation of said star.

* * * * *